(12) United States Patent
Watson

(10) Patent No.: US 7,246,166 B1
(45) Date of Patent: Jul. 17, 2007

(54) ESTABLISHING A COMMUNICATIONS PATH VIA A MULTI-HOMED COMMUNICATIONS NETWORK

(75) Inventor: Mark Watson, London (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 699 days.

(21) Appl. No.: 09/973,656

(22) Filed: Oct. 9, 2001

(51) Int. Cl.
*G06F 15/16* (2006.01)
*H04L 12/66* (2006.01)

(52) U.S. Cl. .................. 709/227; 709/229; 370/352

(58) Field of Classification Search .............. 709/208, 709/245, 249; 370/351, 352, 401, 403
See application file for complete search history.

(56) References Cited

U.S. PATENT DOCUMENTS

| | | | |
|---|---|---|---|
| 6,119,171 A * | 9/2000 | Alkhatib ................. | 709/245 |
| 6,167,052 A * | 12/2000 | McNeill et al. ........... | 370/399 |
| 6,501,761 B1 * | 12/2002 | Pannell et al. ........... | 370/403 |
| 6,608,830 B1 * | 8/2003 | Hirano et al. ............ | 370/351 |
| 6,654,792 B1 * | 11/2003 | Verma et al. ............ | 709/208 |
| 6,697,354 B1 * | 2/2004 | Borella et al. ........... | 370/352 |
| 6,744,773 B1 * | 6/2004 | Harris et al. ............. | 370/401 |
| 6,760,429 B1 * | 7/2004 | Hung et al. ............. | 379/265.09 |
| 2002/0010799 A1 * | 1/2002 | Kubota et al. ........... | 709/249 |

OTHER PUBLICATIONS

Email dated Jul. 26, 2001 to sip@ietf.org—Title: [Sip] update to nat traversal draft!
Email dated Jul. 31, 2001 to sip@ietf.org—Title: [Sip] update to nat traversal draft!

* cited by examiner

*Primary Examiner*—Bunjob Jaroenchonwant
*Assistant Examiner*—Kenny Lin
(74) *Attorney, Agent, or Firm*—Barnes & Thornburg LLP

(57) ABSTRACT

The present invention is concerned with situations in which call signalling follows an indirect path between an originating party and a destination party. Such an indirect path can occur when multi-homed communications networks are used. For example, where a service is provided to an enterprise which has a private address domain and that service is hosted by a service provider whose equipment is located in a public address domain connected to the enterprise domain by two or more address translators. Previously, in this type of situation, resulting media paths also follow the indirect path of the call signalling. This is wasteful of network resources. The present invention enables a direct media path to be set-up. This is achieved by enabling network address translators between two address domains to retain information in call set-up messages about the relevant address in the previous address domain and also by adding network identifier information to call set up messages.

11 Claims, 4 Drawing Sheets

ESTABLISHING A COMMUNICATIONS PATH VIA A MULTI-HOMED COMMUNICATIONS NETWORK

FIELD OF THE INVENTION

The present invention relates to a method and apparatus for establishing a communications path between a first and second entity in a multi-homed communications network.

BACKGROUND TO THE INVENTION

A "multi-homed" communications network is one in which there are two or more address domains, those address domains being connected by two or more nodes which allow address translation between those domains. For example, the nodes which allow address translation may be any suitable type of network address translator (NAT) as is known in the art.

An "address domain" is a region of a communications network in which each network node has an address or identifier which is unique within that region and which is allocated on the basis of a particular method or scheme. For example, the same address may be repeated between two different address domains but not within a single address domain.

When a call is set up, for example in a voice over internet protocol (VoIP) network or a voice over ATM (asynchronous transfer mode) communications network, call signalling occurs between the originating party and the destination party. This also applies when the call involves other media such as video or data instead of or in addition to voice. As a result of this call signalling, in an internet protocol (IP) network, a media path is set up in the reverse direction from the destination party to the originating party. This process also occurs in the other direction such that a media path from the originating party to the destination party is also set up. In an ATM network, after the initial signalling, further signalling occurs as a result of which a bi-directional media path between the parties is set up.

The present invention is concerned with situations in which the call signalling follows an indirect path between the originating party and the destination party. Such an indirect path can occur because of the multi-homed nature of the communications network and the need for the signalling to be routed via entities in the other addressing domain(s), in order to access services provided by those entities (such as routing services provided by Call Servers). Previously, in this type of situation, the resulting media paths also follow an indirect path through the other addressing domain(s). The media may not follow the exact same path as the signalling in that the media will not go through the Call Servers, but it will go through the same sequence of networks. This is wasteful of network resources, increases complexity, reduces voice quality and adds to expense.

The invention seeks to provide an improved method and apparatus for establishing a communications path between a first and second entity in a multi-homed communications network which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

According to a first aspect of the present invention there is provided a method of establishing a communications path between a first entity and a second entity in a communications network. For example, those entities may be user terminals. The communications network comprises at least two address domains which are connected by two or more address translators. The method comprises the steps of:— sending a call set-up message from the first entity to a first one of the network address translators via only a first one of the address domains, said call set-up message containing an address of the first entity within the first address domain;

receiving the call set-up message at the first network address translator and retaining the address of the first entity within the first address domain in the call set-up message as well as adding information about the identity of the first address domain to the call set-up message;

forwarding the call set-up message to the second entity via a second one of the address domains and a second one of the address translators such that the information in the call set-up message can be used to establish a communications path from the second entity to the first entity which includes one or more of said address domains. When the call set-up message is forwarded to the second entity it may be forwarded via further entities such as call servers.

In one example, the resulting call set-up message is used to establish a communications path from the second entity to the first entity via the first address domain alone in the case that the first and second entities are within the same address domain.

This provides the advantage that a direct path between the first and second entity is obtained and can be used for a communications session such as a voice call, video call or any other suitable type of communications session. In cases where the two user terminals are in the same address domain, the path is within only that domain whereas in the prior art situation, the path would have been via both address domains. By using network identifiers as described, it is possible for the method to succeed even when more than two address domains are present.

The call set-up message is sent for the purpose of setting up a media stream between the first and second entities. The process can be repeated such that a second media stream is set up between the entities in the opposite direction to that of the first media stream.

In addition, the first network address translator is arranged to bind a temporary address within the second address domain to the address of first entity within the first address domain; this address being taken from amongst a set of addresses within the second address domain allocated to the network address translator.

According to another aspect of the present invention there is provided an address translator suitable for connection between a first and a second address domain in a communications network, said network address translator comprising:— an input arranged to receive a call set-up message from an entity in the first address domain, said call set-up message comprising an address of the entity within the first address domain;

a processor arranged to modify the received call set-up message by adding information about the identity of the first address domain whilst retaining the address of the entity within the first address domain; and also adding information about an address of the network address translator itself within the second address domain to the call set-up message; said address being bound to the address of the entity in the first address domain.

For example, the address translator may be a network address translator. The processor may be provided externally to the address translator in which case it is connected to the address translator by a communications network.

According to another aspect of the present invention there is provided a method of operating an address translator which is connected between a first and a second address domain in a communications network, said method comprising the steps of:— receiving a call set-up message from an entity in the first address domain, said call set-up message comprising an address of the entity within the first address domain;

modifying the received call set-up message by adding information about the identity of the first address domain whilst retaining the address of the entity within the first address domain in the call set-up message; and also adding information about an address of the network address translator itself within the second address domain to the call set-up message; said address being bound to the address of the entity in the first address domain.

This method may be provided by a computer program arranged to control a network address translator. The computer program may be provided using any suitable programming language as would be apparent to a skilled person in the art.

According to another aspect of the present invention there is provided a call set-up message comprising a transport address, one or more previous transport addresses each corresponding to a different address domain; and, for each previous transport address an associated network identifier. This provides the advantage that address translators arranged as described herein are able to use such call set-up messages to optimise communications paths in multi-homed communications networks.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

Figure 1:
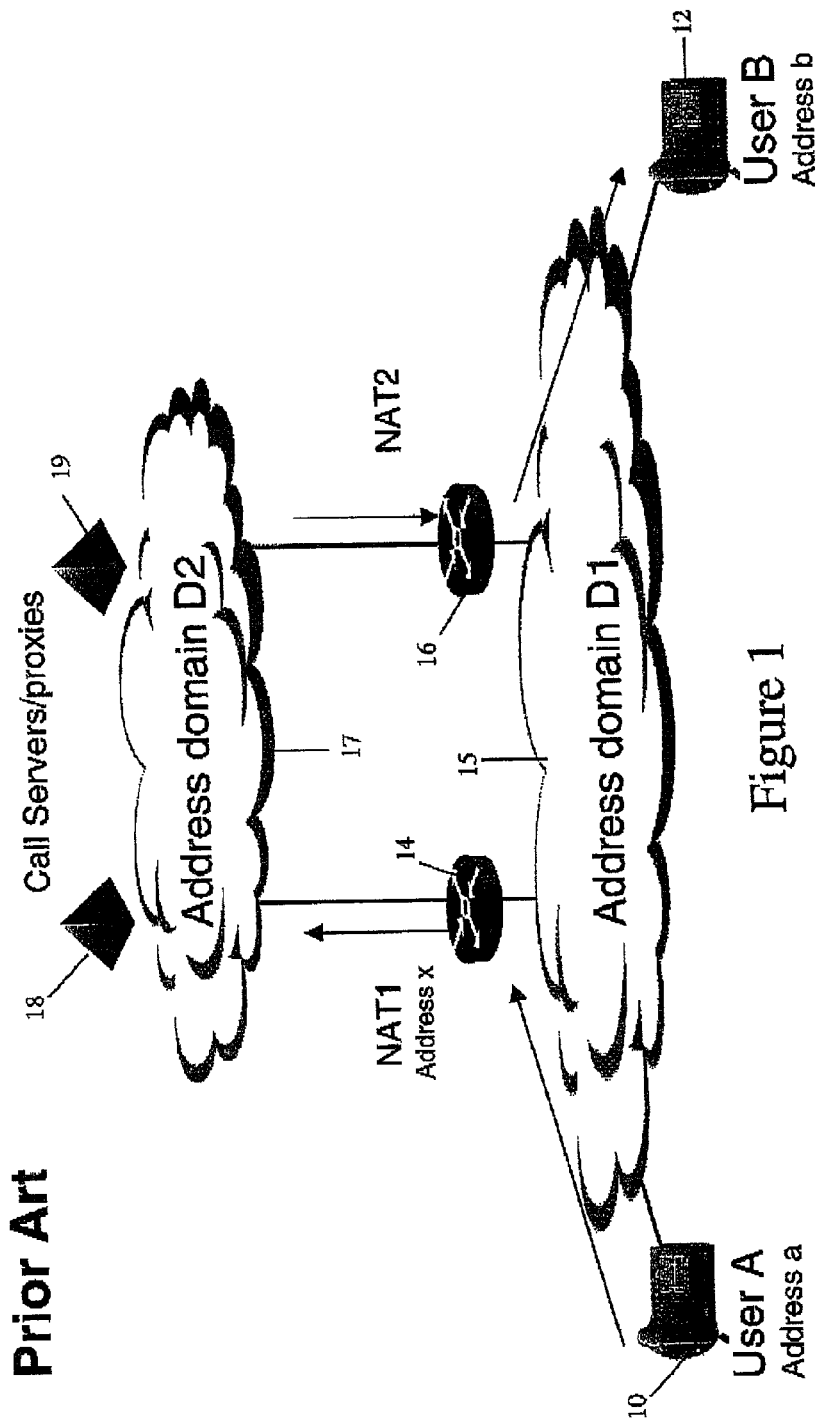
FIG. 1 is a schematic diagram of a multi-homed communications network according to the prior art.

FIG. 1 is a schematic diagram of a multi-homed communications network according to the prior art. The communications network comprises two address domains D1, 15 and D2, 17 which are connected by two address translators 14, 16 which in this example are network address translators (NATs). Other address domains could also be connected to address domain D2 via other NATs although this is riot shown for reasons of clarity.

User terminals are present in each of the address domains and two user terminals 10, 12 are shown in address domain D1 and labelled user A at address A and user B at address B. One or more call server is provided and in this example, two call servers 18, 19 are shown connected to address domain D2. Each user terminal is associated with a particular call server as is known in the art and must make requests for new calls via that call server. In the example shown user A's terminal 10 is associated with call server 18.

In a preferred embodiment, address domain D1 comprises a private communications network such as a communications network of a particular enterprise. Also, address domain D2 is a public communications network where the term "public" is used in a special sense to indicate that entities within D1 are able to route to entities in D2 because the addresses of D2 entities are available to D1 entities "publicly". However, address domain D1 is not "public" with respect to address domain D2. That is, entities in domain D2 cannot simply route to entities in D1 because the addresses of entities in D1 are not directly available to D2 entities. In this way there is an asymmetry in the connections between address domain D1 and address domain D2. A service provider may offer a voice or multimedia service to the enterprise and do this using the call servers connected to domain D2. The voice or multimedia service is referred to as being hosted outside the enterprise network to which the service is offered.

Consider the situation in which it is required to set up a communications path between user A and user B. According to the prior art, user A initiates the communication by sending a call set up request to the associated call server which in this case is call server 18. This call set up request is sent from user terminal A to NAT 1, 14 and comprises a request for a media path from user terminal B to user terminal A. The call set up request also contains the media transport address of user terminal A within address domain D1. This address is referred to as D1:*a* for the sake of clarity, where "D1" indicates that the domain D1 is used and "a" indicates that the address is of terminal A.

When NAT 1, 14 receives the call set-up request it creates a binding between an address x of a port on the NAT and terminal A. That is, address x, which is an address within domain D2, is arranged to forward to terminal A in domain D1. This is achieved as is known in the art. NAT 1 then modifies the call set up message by removing the address of user terminal A within address domain D1 and replacing that address by address x. This address is referred to as D2:*x* for clarity.

The present invention recognises that problems arise as a result of removing the address of user terminal A from the call set up message in this way. These problems arise in the particular situation that domain D1 is multi-homed.

Figure 2:
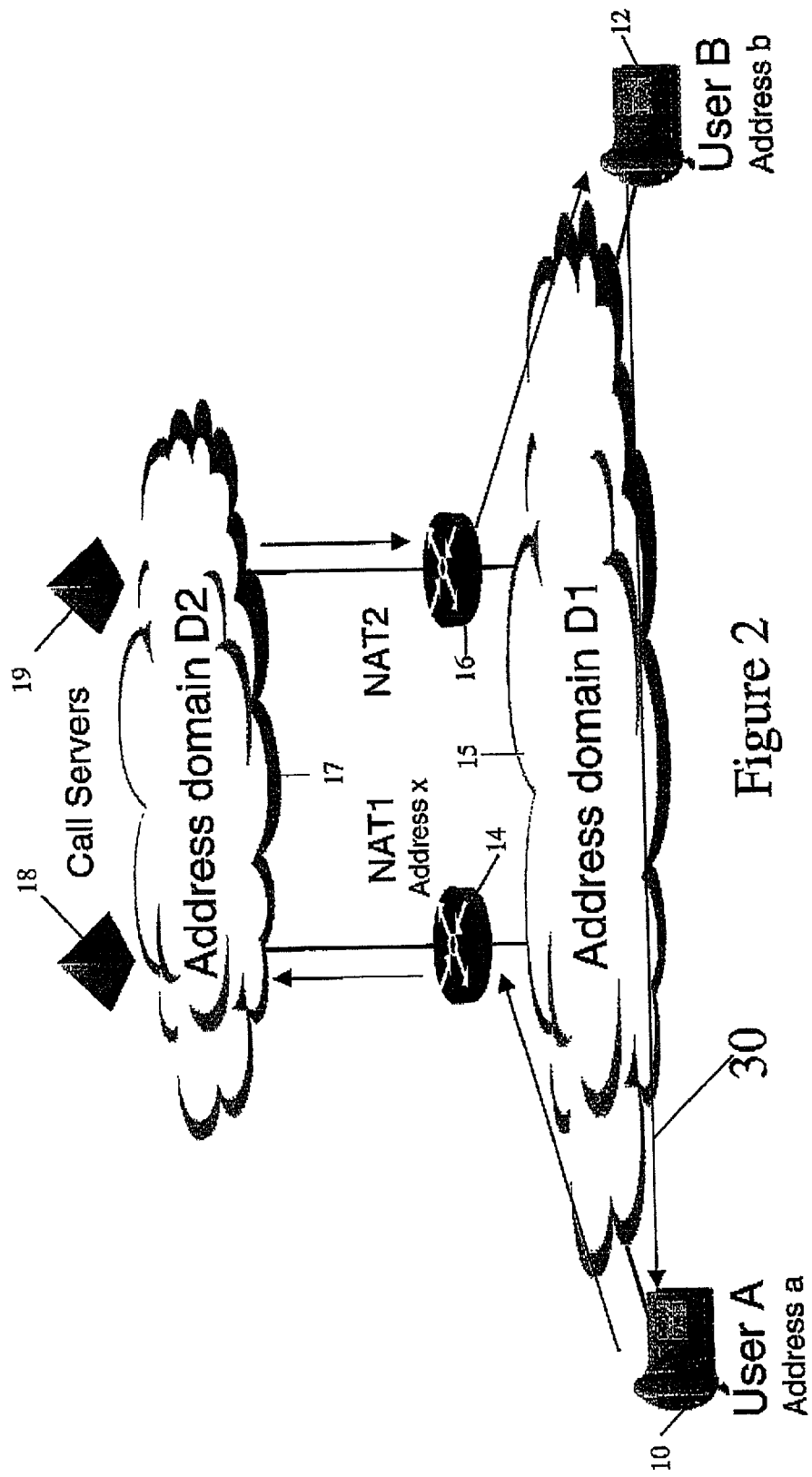
FIG. 2 is a schematic diagram of a multi-homed communications network according to the present invention.

Once NAT 1 has modified the call set-up message it forwards that message via call server 18 to NAT 2 and from NAT 2 to user B. A media path is then set up from user B to user A via NAT 2, domain D2, NAT 1 and back to user A. This is illustrated in FIG. 1. The present invention recognises that this method increases network load and reduces voice quality because it would be more efficient to establish the media path from user B to user A directly via address domain D1 as illustrated in FIG. 2

This is achieved by modifying the software or methods carried out at the NATs. Instead of removing the address of user terminal A from the call set up message, this information is retained together with an identifier indicating the identity of the originating address domain. Each NAT or other address translator is arranged to be associated with a particular address domain and to add an identifier to each call set up message indicating the unique identity of that address domain. The address domain identifiers are preconfigured at each address translator or are assigned automatically using a suitable algorithm as is apparent to a skilled person in the art.

The term "transport address" is used to refer to an address of an entity in a particular address domain of a communications network. A transport address is contained in a call signalling message and gives an address which is applicable to the current address domain that the call signalling message is in.

When the address of user terminal A is retained in the call set up message it is retained in such a way that indicates that it is not the current transport address. Such an address is referred to herein as a "previous address". A previous address has an associated network identifier which indicates in which address domain that previous address would be a transport address.

When it is required to set up a communications path between user terminal A and user terminal B the method begins as in the prior art, with a call set up message being sent to call server 18 via NAT 1.

Figure 4:
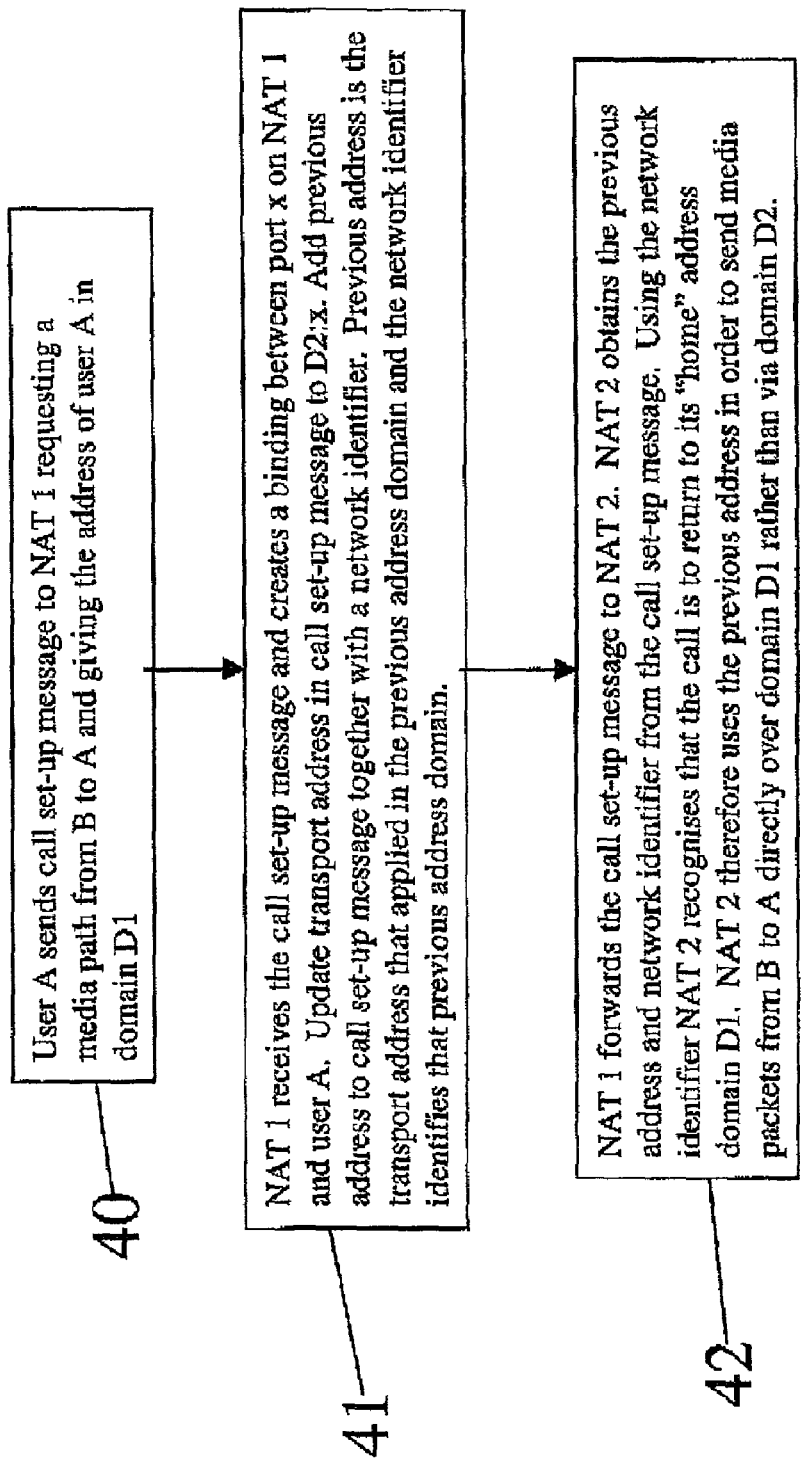
FIG. 4 is a flow diagram of a method of establishing a communications path in a multi-homed communications network.

The call set up message sent from user terminal A contains a transport address for terminal A which is D1:*a* and also a request to set up a media path from terminal B to terminal A (see step 40 of FIG. 4).

Referring to FIGS. 2 and 4, NAT 1 receives the call set up message and creates a binding between an address x of a port on the NAT and terminal A. NAT 1 then modifies the call set up message by updating the address of user terminal A within address domain D1 with address x. This address x is referred to as D2:*x* for clarity and is the new transport address in the set up message. The previous transport address, which was D1:*a* is not discarded however, but retained in the call set up message as a "previous transport message". In addition, a network identifier is added to the call set up message received by NAT 1, and is associated with the previous transport message. For example, this network identifier added by NAT 1 may be D1 in order to indicate that the previous transport message is associated with address domain D1. (See step 41 of FIG. 4.)

The modified call set up message is then forwarded from NAT 1 to call server 18 and via address domain D2 to NAT 2. NAT 2 obtains the network identifier associated with the previous address from the call set up message. If this network identifier is the same as the network identifier associated with NAT 2 itself, then it is recognised that the call is to return to a location within the "home" address domain of NAT 2. NAT 2 then extracts the previous address D1:*a* and sets up a media path from user B to D1:*a* directly via address domain D1. This is indicated by arrow 30 in FIG. 2. This process can also occur in reverse to set up a media path from A to B. (See step 42 of FIG. 4.)

Figure 3:
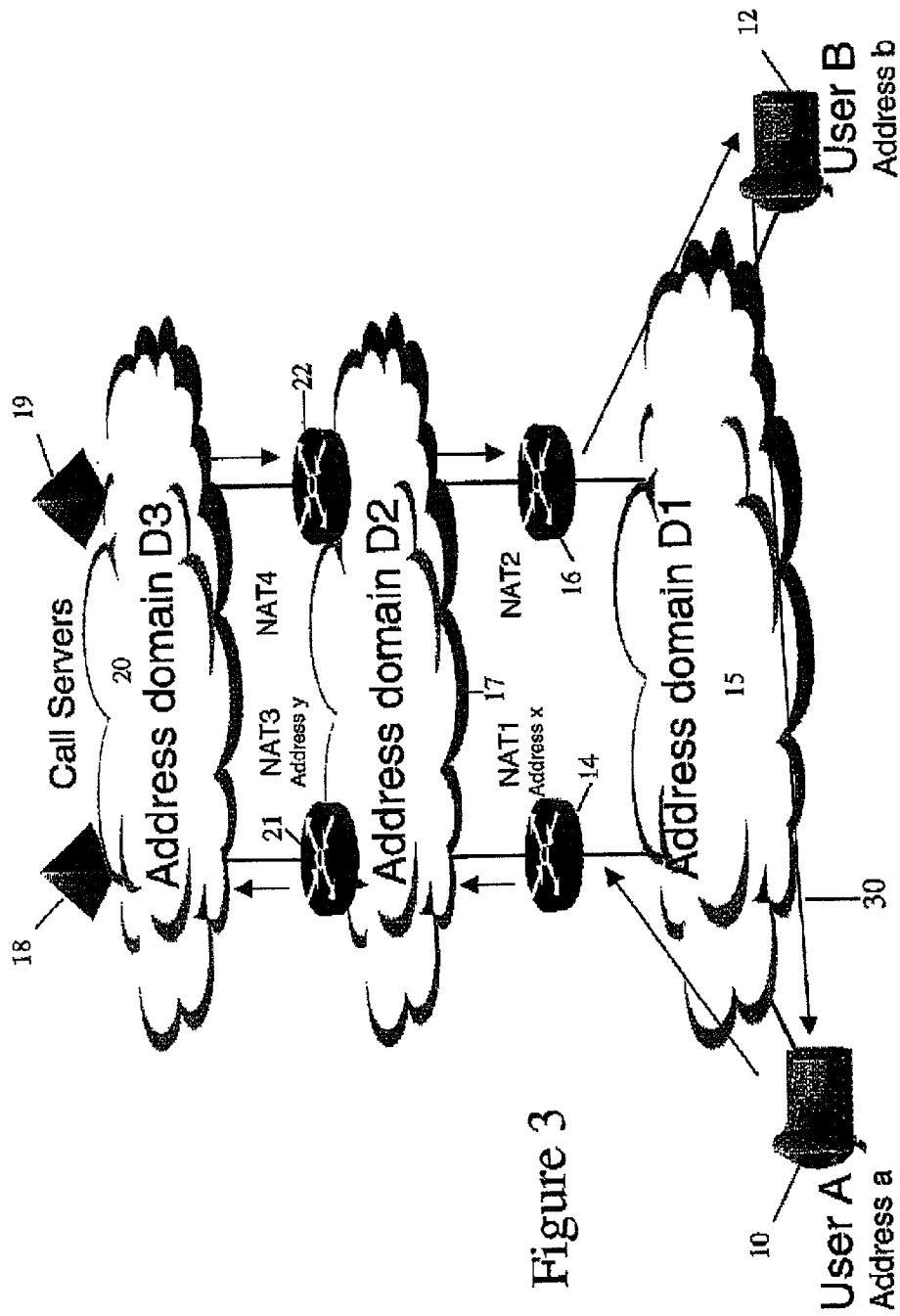
FIG. 3 is a schematic diagram of a multi-homed communications network comprising three different address domains.

This method also extends to deal with situations involving more than two address domains. For example, FIG. 3 shows an arrangement with three address domains D1, D2 and D3.

Such a situation arises for example where an end customer has a private address domain D1 which is connected to a public address domain D2. That public address domain D2 is then itself connected to a private address domain of a service provider for example. The word "private" is used here in the sense discussed above. Certain arrangements are required on the network address translator between D2 and D3 to enable unsolicited signalling messages to reach certain entities (such as call servers) within D3, as would be apparent to someone skilled in the art.

The method proceeds as described above with respect to FIG. 2, but with the NATs which connect between D2 and D3 being arranged to add a second "previous address" and associated network identifier to the call set up message.

For situations involving more than two address domains, the NATs between D2 and D3 then behave slightly differently from the NATs between D1 and D2. In the latter case, when a message passes from 'private' to 'public' side, then the 'previous address' is retained and a new address added (call this behaviour A). When a message passes from 'public' to 'private' side, the NAT checks whether any 'previous addresses' match the destination (private) network and removes them if they do not (call this behaviour B).

For the NATs between D2 and D3 the behaviour is reversed. When a message passes from 'public' to 'private' side, then it performs behaviour A and when it passes from 'private' to 'public' side it performs behaviour B.

The consequence is that for situations involving more than two address domains, NATs between the second and third address domains are arranged to perform either Behaviour A or Behaviour B based on the call set-up message direction and a configuration option. That is, NATs between the second and third address domains are configured to perform behaviour A for messages in the 'public' to 'private' direction and behaviour B for messages in the 'private' to 'public' direction, whereas NATs between the first and second domains are configured to perform behaviour B for messages in the 'public' to 'private' direction and behaviour A for messages in the 'private' to 'public' direction.

With reference to FIG. 3, NAT 1 receives the call set up message and modifies it as described above by adding a new transport address D2:*x*, updating the previous transport address D1:*a* to a previous address field in the message and adding a network identifier D1 associated with the previous address. The modified call set up message is then forwarded by NAT 1 to NAT 3, 21. NAT 3 modifies the call set up message further. A binding is created between an address (say y) of a port on NAT 3 and port x of NAT 1. The new transport address is therefore D3:*y* and is added to the call set up message. A new "previous address" is also formed from the transport address that was applicable in domain D2. This is added to the call set up message together with an associated network identifier which in this case is D2. The call set up message then has two "previous addresses" in an ordered list.

The call set up message is forwarded on to the call server 18 and via domain D3 to NAT 4, 22. NAT 4 obtains the call set up message and checks the network identifier of the 'previous address' fields within the call is set up message. If one of the network identifiers has the same value as that of address domain with which NAT 4 is associated then NAT 4 removes the transport address, and replaces it with the "previous address" applicable to the subsequent network. In this case this action would be taken in respect of the transport address applicable to domain D2 which was added by NAT 3. NAT 4 now forwards the call set up message on to NAT 2 using known methods. In the case that none of the "previous address" fields have a network identifier matching the address domain with which NAT 4 is associated then NAT 4 simply forwards the call set up message to NAT 2 with no changes.

NAT 2 receives the call set up message and is able to determine that it is the NAT of the address domain in which user B, the destination terminal is located. This is achieved using known methods. NAT 2 then checks the network identifier(s) in the call set up message. If one of the network identifier(s) has the same value as that of the address domain with which NAT 2 is associated, then NAT 2 realises that user A, the originating terminal, has an address in the same address domain as user B, the destination terminal. A media path is then set up between user A and user B directly via address domain D1 as shown by arrow 30 in FIG. 3.

Consider the case where User B is located in address domain D2. In the prior art situation, the call signalling would pass from user A to NAT 1, to NAT 3, to call server 18 to NAT 4 and to user B. The media path would then flow through the same address domains in reverse instead of avoiding the need to travel through address domain D3. The present invention enables this situation to be avoided.

The method described above with reference to FIG. 3 is followed and when the call set up message reaches NAT 4, that NAT realises that it is directly connected to the address domain in which the destination terminal is located. NAT 4 therefore checks the network identifier of the most recent previous address in the call set up message. If this network identifier is the same as the network identifier associated with NAT 4 then NAT 4 obtains the associated previous address from the call set up message. In this case that previous address is D2:$x$ for example. A media path is then set up from the destination terminal to D2:$x$ in domain D2 without travelling via D3.

In the examples discussed above the NATs or other address translators are able to modify call set up messages. These set up messages are provided using any suitable signalling protocol such as session initiation protocol SIP or H.248/Megaco (media gateway control protocol). In order to modify the call set up messages, the NATs have access to information about the signalling protocol used. Such NATs are referred to as being "application aware". The address translators may have this "application aware" functionality either by possessing the necessary processors and software themselves, or by accessing this capability from another entity in the communications network, in which case it is this entity which will modify the signalling messages, and instruct the address translator as to address bindings, as is known in the art. This is referred to as a distributed case.

In a preferred example, the functions of an application aware NAT comprise:
  (i) receiving, processing and amending the call signalling message;
  (ii) creating and installing the 'bind' between the private address of A and one of the public addresses of the NAT;
  (iii) forwarding subsequent packets which arrive at this public NAT address on towards A.

And in the distributed case, the NAT itself performs functions (ii) and (iii) above whilst accessing the functions of step (i) from another entity, referred to as a NAT controller. The NAT controller can be located in the private or public address domain, and if it is in the public address domain, the signalling message may or may not go through the same NAT to get to the controller. Known techniques to determine how the signalling messages are sent from place to place are used. In practice, the NAT controller will often be part of the Call Server(s).

The communications network itself may be an internet protocol (IP) communications network, an asynchronous transfer mode (ATM) communications network or any other suitable type of communications network. Also, it is not essential for each address domain to be provided using the same type of communications network. For example, domain D1 may be an IP network whilst domain D2 is an ATM network.

Any signalling protocol may be used which is suitable for carrying the previous addresses and network identifiers in the call set up message. For example, session description protocol (SDP) 'group' and 'mid' attributes presently being discussed in the IETF (Internet Engineering Task Force) may be used.

Presently, an SDP string contains one or more 'media descriptions' which include details of the media transport addresses. The 'group' attribute allows multiple media descriptors to be grouped together with certain semantics.

The present invention requires the ability to specify multiple alternative media transport addresses for a single media stream, and one implementation of this would be to group multiple 'media descriptors' using the group attribute.

The group attribute is defined as follows:
  group-attribute="a=group:" semantics*(space identification-tag)
  semantics="LS"|"FID"

For our purposes we extend the definition of 'semantics' as follows:
  Semantics="LS"|"FID"|"ALT"

The new 'ALT' value has the meaning that all media descriptors within the group are to be treated as alternative descriptions for the same media stream. The group attribute lists after the 'semantics' fields the identity values or each media descriptor in the group. Media descriptors are allocated identities using the 'mid' attribute defined as follows:
  mid-attribute="a=mid:" identification-tag
    identification-tag=token Finally, a new attribute would be required to carry the network identification discussed herein. For the purposes of this example, a new 'domain' attribute is defined as follows:
  Domain-attribute="a=domain:" token The following example SDP string shows two alternative media descriptors, one for the original media transport address of A in domain D1 (D1:$a$=IP address 10.23.24.25 port 27654) and one for the media transport address in domain D2 allocated by NAT 1 for A (D2:$x$=IP address 224.2.17.12 port 30123):
  v=0
  o=Laura 289083124 289083124 IN IP4 one.example.com
  t=0 0
  a=group:ALT 1 2
  m=audio 30123 RTP/AVP 0
  c=IN IP4 224.2.17.12/127
  a=mid:1
  m=audio 27654 RTP/AVP 0
  c=IN IP4 10.23.24.25127
  a=domain: com.nortelnetworks.privatenetwork
  a=mid:2

Other ways of specifying this information in SDP could be defined, for example by specifying "previous addresses" as additional attributes to a single Media Descriptor. This would have the advantage of being backwards compatible with NAT devices which did not support the mechanisms of the present invention.

Other ways of addressing the problem of the present invention have been considered previously by others who have contributed to the IETF Session Initiation Protocol list (a public bulletin board on the internet for discussion about session initiation protocol) but none of these involve using network identifiers as proposed herein. The network identifiers proposed herein are particularly advantageous because they allow the method to operate successfully in the case that more than two different address domains are used as would be the case in any real-world situation. Also, previous proposals have not suggested using more than one previous address as in the method described herein with reference to FIG. 3. This allows for the case where the service provider is operating from a 'private' domain.

Any range or device value given herein may be extended or altered without losing the effect sought, as will be apparent to the skilled person for an understanding of the teachings herein.

A range of applications are within the scope of the invention. These include situations in which it is required to optimise routing of media packets in multi-homed communications networks.

The invention claimed is:

1. A method of enabling the establishment of a communications path between a first entity and a second entity in a communications network comprising at least two address domains, said address domains being connected by two or more network address translators, said method comprising the steps of:
   i) sending a call set-up message from the first entity to a first one of the network address translators via only a first one of the address domains, said call set-up message containing an address of the first entity within the first address domain;
   ii) receiving the call set-up message at the first network address translator and retaining the address of the first entity in the call set-up message as well as adding information indicating the identity of the first address domain to the call set-up message;
   iii) forwarding the call set-up message with said added information to the second entity via a second one of the address domains and a second one of the network address translators, such that the information in the call set-up message can be used to establish a communications path from the second entity to the first entity which excludes a second one of the address domains when it is determined, using the added information, that the second entity is within the first address domain.

2. A method as claimed in claim 1 wherein said step (ii) of receiving further comprises creating a binding between a second address domain address for a port at the first network address translator and the first address domain address of the first entity; and once said binding is created adding the second address domain address of that port to the call set-up message.

3. A method as claimed in claim 1 which further comprises, after said step (ii) of receiving, forwarding the call set-up message to a third address domain via a third network address translator.

4. A method as claimed in claim 3 which further comprises at the third network address translator, adding information about an identity of the third address domain to the call set-up message.

5. A method as claimed in claim 1 wherein said first network address translator is arranged to access information from another network entity in order to carry out the method of step (ii) of claim 1 in respect of adding information about the identity of the first address domain to the call set-up message.

6. A method as claimed in claim 1 wherein said communications path is arranged to provide a service that is hosted by one or more servers within the communications network but not within the first address domain.

7. A method as claimed in claim 1 wherein said first address domain is provided in a private region of the communications network and said second address domain is provided in a public region of the communications network.

8. A method as claimed in claim 1 wherein said communications network is selected from an internet protocol communications network or an asynchronous transfer mode communications network.

9. A network address translator suitable for connection between a first and a second address domain in a communications network, said network address translator comprising:
   an input arranged to receive a call set-up message from a first entity in the first address domain, said call set-up message comprising an address of the first entity;
   a processor arranged to modify the received call set-up message by adding information indicating the identity of the first address domain whilst retaining the address of the first entity; and also adding an address of the network address translator within the second address domain to the call set-up message; said address of the network address translator being bound to the address of the first entity;
   a output arranged to forward the modified call set-up message to a second entity via the second address domain, such that the information in the call set-up message can be used to establish a communications path from the second entity to the first entity which excludes a second one of the address domains when it is determined, using the added information, that the second entity is within the first address domain.

10. A network address translator as claimed in claim 9 wherein said processor is provided externally to the network address translator and is connected to the network address translator by a communications network.

11. A method of operating a network address translator which is connected between a first and a second address domain in a communications network, said method comprising the steps of:
   i) receiving a call set-up message from a first entity in the first address domain, said call set-up message comprising an address of the first entity;
   ii) modifying the received call set-up message by adding information indicating the identity of the first address domain whilst retaining the address of the first entity in the call set-up message; and also adding an address of the network address translator within the second address domain to the call set-up message; said address of the network address translator being bound to the address of the first entity;
   iii) forwarding the modified call set-up message to a second entity via the second address domain, such that the information in the call set-up message can be used to establish a communications path from the second entity to the first entity which excludes a second one of the address domains when it is determined, using the added information, that the second entity is within the first address domain.

* * * * *